(12) United States Patent
Shimono et al.

(10) Patent No.: US 8,932,661 B2
(45) Date of Patent: *Jan. 13, 2015

(54) SALTY TASTE ENHANCER AND FOOD OR DRINK CONTAINING SAME

(75) Inventors: Masashi Shimono, Hachioji (JP); Kiminori Sugiyama, Hachioji (JP)

(73) Assignee: Nippon Suisan Kaisha, Ltd., Tokyo (JP)

( * ) Notice: Subject to any disclaimer, the term of this patent is extended or adjusted under 35 U.S.C. 154(b) by 26 days.

This patent is subject to a terminal disclaimer.

(21) Appl. No.: 12/934,028

(22) PCT Filed: Mar. 23, 2009

(86) PCT No.: PCT/JP2009/055664
§ 371 (c)(1),
(2), (4) Date: Sep. 22, 2010

(87) PCT Pub. No.: WO2009/119503
PCT Pub. Date: Oct. 1, 2009

(65) Prior Publication Data
US 2011/0027451 A1 Feb. 3, 2011

(30) Foreign Application Priority Data
Mar. 24, 2008 (JP) ................. 2008-074862

(51) Int. Cl.
*A23L 1/227* (2006.01)
*A23L 1/237* (2006.01)
*A23L 1/22* (2006.01)
*A23L 1/325* (2006.01)

(52) U.S. Cl.
CPC ............. *A23L 1/237* (2013.01); *A23L 1/22091* (2013.01); *A23L 1/3252* (2013.01); *A23L 1/3255* (2013.01)
USPC ........... 426/656; 426/649; 426/650; 426/652; 426/655; 426/657

(58) Field of Classification Search
USPC .................. 426/649, 650, 652, 655, 656, 657
See application file for complete search history.

(56) References Cited

U.S. PATENT DOCUMENTS 5,000,977 A 3/1991 Marggrander et al.
5,145,707 A 9/1992 Lee (Continued)

FOREIGN PATENT DOCUMENTS

EP 0 608 712 8/1994
EP 0 677 249 10/1995

(Continued)

OTHER PUBLICATIONS

Nakata, et al., "Role of Basic and Acidic Fragments in Delicious Peptides (Lys-Gly-Asp-Glu-Glu-Ser-Leu-Ala) and the Taste Behavior of Sodium and Potassium Salts in Acidic Oligopeptides", Biosci. Biotech. Bilchem, 1995, vol. 59, No. 4, pp. 689-693.

(Continued)

*Primary Examiner* — Helen F Heggestad
(74) *Attorney, Agent, or Firm* — Hamre, Schumann, Mueller & Larson, P.C.

(57) ABSTRACT

It is possible to provide an excellent salty taste enhancer is provided that can compensate for insufficient salty taste when attempting to reduce salt content in a food. A salty taste enhancer consisting of a mixture of an enzymatic decomposition product of an animal protein and an enzymatic decomposition product of a plant protein. A salty taste enhancer in which the enzymatic decomposition products are treated with a protein-hydrolyzing enzyme and/or a nucleic acid-hydrolyzing enzyme. A salty taste enhancer in which the animal protein is a fish or shellfish extract and the plant protein is a soy bean protein. A salty taste enhancer in which a basic amino acid, and especially arginine, is further added to the salty taste enhancer. A salty taste enhancer to which potassium chloride is further added. A salty taste enhancer obtained by rendering the salty taste enhancer mildly acidic. A method for producing these salty taste enhancers, a method for enhancing a salty taste by using these salty taste enhancers, and a food or drink that contains these salty taste enhancers.

14 Claims, 3 Drawing Sheets

(56) References Cited

U.S. PATENT DOCUMENTS

| | | |
|---|---|---|
| 5,711,985 A | 1/1998 | Guerrero et al. |
| 6,159,529 A | 12/2000 | Uchida et al. |
| 6,974,597 B2 | 12/2005 | Ohta et al. |
| 2003/0091721 A1 | 5/2003 | Ohta et al. |
| 2003/0099760 A1 | 5/2003 | Okai et al. |
| 2011/0064861 A1 | 3/2011 | Shimono et al. |

FOREIGN PATENT DOCUMENTS

| | | |
|---|---|---|
| EP | 1 080 645 | 3/2001 |
| EP | 1163853 | 12/2001 |
| JP | 71010898 * | 7/1967 |
| JP | 58-193676 | 11/1983 |
| JP | 61-115464 | 6/1986 |
| JP | 63-3766 | 1/1988 |
| JP | 63-137658 | 6/1988 |
| JP | 4-108358 | 4/1992 |
| JP | 7-289198 | 11/1995 |
| JP | 10-66540 | 3/1998 |
| JP | 11-187841 | 7/1999 |
| JP | 2000-37170 | 2/2000 |
| JP | 2003-144088 | 5/2003 |
| WO | 01/39613 | 6/2001 |
| WO | 2007/045566 | 4/2007 |
| WO | WO 2007/042274 | 4/2007 |
| WO | 2007/055393 | 5/2007 |

OTHER PUBLICATIONS

Shimono, et al., co-pending U.S. Appl. No. 12/922,620, filed Sep. 14, 2010—24 pages.

Nakata, et al., "Role of Basic and Acidic Fragments in Delicious Peptides (Lys-Gly-Asp-Glu-Glu-Ser-Leu-Ala) and the Taste Behavior of Sodium and Potassium Salts in Acidic Oligopeptides", Biosci. Biotech. Biochem, 1995, vol. 59, No. 4, pp. 689-693.

* cited by examiner

SALTY TASTE ENHANCER AND FOOD OR DRINK CONTAINING SAME

TECHNICAL FIELD

The present invention relates to a salty taste enhancer for compensating for a weak or insufficient salty taste in foods and drinks having a reduced common salt content, a method for enhancing salty taste by using this salty taste enhancer, and a food or drink that contains this salty taste enhancer.

BACKGROUND ART

Common salt (sodium chloride) is an indispensable nutrient for human beings. For example, common salt plays an important role in regulating the water content and pH of the body, digesting food, nutrient absorption, neurotransmission, and so on. Furthermore, common salt plays an important role in influencing the flavor of foods and drinks. For example, common salt enhances deliciousness and flavor, preserves food, facilitates the production of fermented foods such as miso (fermented soybean paste), soy sauce and bread, imparts texture to paste products and udon (thick wheat flour noodle) noodles, and preserves the color of chlorophyll through stabilization. Therefore, common salt is indispensable for human life, but it is thought that ingesting excessive quantities of common salt raises the risk of conditions such as hypertension, kidney disease and heart disease, although there are a number of views on this. As a result, much importance has been placed on the quantity of common salt ingested, and especially the quantity of sodium ingested, and the reduction of this intake has become a matter of concern. This is not only in order to treat diseases that have already occurred, but also to provide means for preventing healthy people from developing diseases.

In order to reduce the quantity of common salt ingested, one method that has been considered is simply to reduce the quantity of common salt used when seasoning or processing food, but because common salt plays an important role in the flavor of foods, as mentioned above, foods and drinks which simply have reduced quantities of common salt lose flavor and become bland. Therefore, there is a strong demand for the development of a technique that does not diminish the salty taste and flavor of a food or drink having reduced common salt content.

One conventional method for reducing the common salt content of a food or drink without diminishing salty taste or flavor was to use a substance that had an inherent salty taste, that is, use of a common salt alternative. For example, potassium salts such as potassium chloride, ammonium salts such as ammonium chloride and magnesium salts such as magnesium chloride are known as typical common salt alternatives. Furthermore, amino acid hydrochlorides such as glycine ethyl ester hydrochloride and lysine hydrochloride and peptides comprising basic amino acids such as ornithyltaurine, ornithyl-β-alanine and glycyl lysine are also known as common salt alternatives. These salty taste alternatives have the drawback of imparting a bitter, peculiar, or unpleasant taste in addition to a salty taste. As techniques for using these salty taste alternatives to reduce the quantity of common salt used and suppress flavors other than the salty taste that are unpleasant, a seasoning composition obtained by blending specific proportions of potassium chloride, ammonium chloride, calcium lactate, sodium L-aspartate, an L-glutamate and/or a nucleic acid-based taste substance (Patent document 1), and a method for removing the bitter taste of potassium chloride by combining with a calcium salt or magnesium salt of an organic acid (Patent document 2) are known. However, a salt reduction technique that meets users' needs has yet to be achieved for reasons such as the presence of unpleasant tastes in addition to the salty taste and the strength of the salty taste being low.

Furthermore, another method for reducing the quantity of common salt used in a food or drink without impairing salty taste or flavor is to use a substance that enhances salty taste and does not impair salty taste even when the quantity of common salt is reduced, that is, use a salty taste-enhancing substance. There have been many reports of such substances, such as a combination of L-arginine, L-aspartic acid and sodium chloride (Patent document 3), a peptide having a molecular weight of 50,000 Daltons or lower obtained by hydrolyzing collagen (Patent document 4), thaumatin (Patent document 5), protein hydrolysates of various protein materials (Patent document 6), trehalose (Patent document 7), yeast extract (Patent document 8), a peptide obtained by subjecting a protein to hydrolysis and deamidation (Patent document 9) and a taste improver having, as a primary component, a neutral salt obtained by reacting a basic amino acid with citric acid (Patent document 10). However, from the perspectives of common salt reduction effect, flavor, economy and the like, an effective technique that meets consumer demands has yet to be achieved, and there is still a strong need for an effective common salt reduction technique that does not impair salty taste or flavor even when the quantity of common salt used is reduced.

Patent document 1: Japanese Unexamined Patent Application Publication No. H11-187841
Patent document 2: Japanese Unexamined Patent Application Publication No. H04-108358
Patent document 3: U.S. Pat. No. 5,145,707
Patent document 4: Japanese Unexamined Patent Application Publication No. S63-3766
Patent document 5: Japanese Unexamined Patent Application Publication No. S63-137658
Patent document 6: Japanese Unexamined Patent Application Publication No. H07-289198
Patent document 7: Japanese Unexamined Patent Application Publication No. H10-66540
Patent document 8: Japanese Unexamined Patent Application Publication No. 2000-37170
Patent document 9: Publication of the International Application in Pamphlet No. 01/039613
Patent document 10: Japanese Unexamined Patent Application Publication No. 2003-144088

DISCLOSURE OF THE INVENTION

Problems that the Invention is to Solve

An object of the present invention is to provide a salty taste enhancer for complementing a weak or insufficient salty taste in foods and drinks having a reduced common salt content, a method for enhancing a salty taste by using this salty taste enhancer, and a food or drink that contains this salty taste enhancer.

Means for Solving the Problems

The essence of the present invention resides in the following salty taste enhancers (1) to (10).
(1) A salty taste enhancer that contains an enzymatic decomposition product of an animal protein and an enzymatic decomposition product of a plant protein.

(2) The salty taste enhancer described in (1), wherein the enzymatic decomposition products are treated with a protein-hydrolyzing enzyme and/or a nucleic acid-hydrolyzing enzyme.

(3) The salty taste enhancer described in (1) or (2), wherein the animal protein is a fish or shellfish protein.

(4) The salty taste enhancer described in any one of (1) to (3), wherein the animal protein is a fish or shellfish extract.

(5) The salty taste enhancer described in any one of (1) to (4), wherein the plant protein is a protein of soy beans, wheat or corn.

(6) The salty taste enhancer described in any one of (1) to (5), which contains the enzymatic decomposition product of an animal protein and the enzymatic decomposition product of a plant protein at a ratio of between 1:10 and 10:1.

(7) The salty taste enhancer described in any one of (1) to (6), further containing a basic amino acid.

(8) The salty taste enhancer described in (7), wherein the basic amino acid is arginine.

(9) The salty taste enhancer described in any one of claims (1) to (8), further containing potassium chloride.

(10) The salty taste enhancer described in any one of (1) to (9), wherein the pH is adjusted to a value of 5 to 8.

The essence of present invention also resides in the following salty taste enhancement methods (11) to (13) and the following foods or drinks (14) to (15).

(11) A method for enhancing a salty taste, wherein the salty taste enhancer described in any one of (1) to (10) is added to a common salt-containing food.

(12) A method for enhancing a salty taste, wherein an enzymatic decomposition product of an animal protein, an enzymatic decomposition product of a plant protein and arginine are contained in a common salt-containing food.

(13) The salty taste enhancing method described in (12), further containing potassium chloride.

(14) A food or drink that contains the salty taste enhancer described in any one of (1) to (10).

(15) The food or drink described in (12), wherein the common salt content is lower than in conventional foods or drinks.

Advantage of the Invention

Adding the salty taste enhancer of the present invention to a common salt-containing food has the effect of strongly enhancing the salty taste derived from common salt contained in the food. Therefore, by using the salty taste enhancer of the present invention, even if the quantity of common salt in a food item is reduced, it is possible to produce a salty taste equivalent to that before the quantity of common salt was reduced, and thus it is possible to reduce the quantity of common salt used.

BEST MODE FOR CARRYING OUT THE INVENTION

Figure 1:
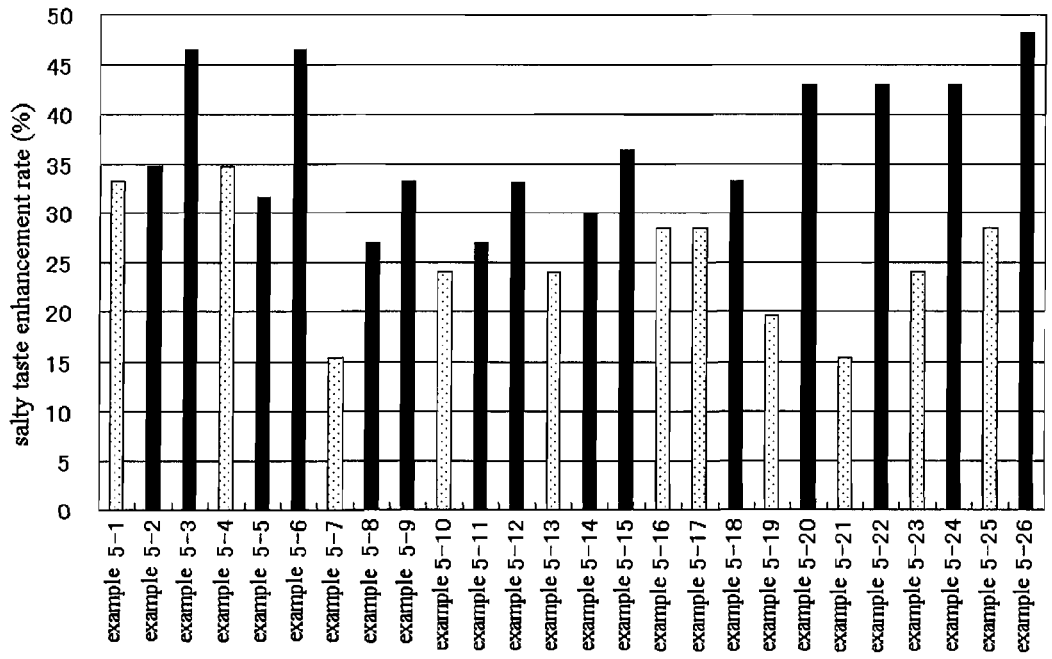
FIG. 1 shows the results of salty taste enhancement effect evaluations of the salty taste enhancers of the present invention, in which a variety of enzymatic decomposition products of animal proteins and a variety of enzymatic decomposition products of plant proteins are blended, as described in Working Example 5.

The present invention relates to a salty taste enhancer that contains an enzymatic decomposition product of an animal protein and an enzymatic decomposition product of a plant protein.

In the present invention, animal protein means a protein derived from the meat or internal organs of domestic animals, poultry, fish or shellfish or a protein derived from milk, eggs or the like. Specifically, it is possible to use a variety of animal-derived proteins, such as beef extract, chicken extract, pork extract, fish extract, casein, gelatin, or egg albumen. Fish and shellfish extracts are particularly preferred. Bonito extract, milt extract, conger eel extract, lizardfish extract, tuna extract, scallop extract, hill extract, cod roe extract and the like can be cited as examples thereof. It is also possible to use broths produced during canning processes.

In the present invention, plant protein means a protein obtained from cereals, vegetables and the like. Specifically, it is possible to use a variety of plant-derived proteins obtained by processing soy beans, wheat, corn, rice or the like. It is preferable to use a soy protein isolate, soy milk protein, concentrated soy protein, defatted soy protein, wheat gluten, corn gluten, or the like.

In the present invention, enzymatic decomposition product means a product obtained by decomposing the above-mentioned animal proteins and plant proteins into a mixture of amino acids and peptides by means of an enzyme. It is possible to use a variety of proteolytic enzymes. Because the proteins should be substantially decomposed by the enzyme, a decomposition product obtained by fermentation and the like may be used.

The protein hydrolase may be an endopeptidase or an exopeptidase, and one or more types thereof may be used.

The endopeptidase may be, for example, a serine protease such as trypsin, chymotrypsin or subtilisin, an aspartic acid protease such as pepsin, a metal protease such as thermolysin, or a cysteine protease such as papain. Endopeptidases that are commercially available as food additives include ALCA-LASE (a protease produced by Novozymes), NEUTRASE (a protease produced by Novozymes), NUCLEICIN (a protease produced by HBI), SUMITEAM MP (a protease produced by Shin Nihon Chemicals Corporation), BROMELAIN F (a protease produced by Amano Enzyme Inc.), ORIENTASE 20A (a protease produced by HBI), MOLSIN F (a protease produced by Kikkoman Corporation), NEWLASE F (a protease produced by Amano Enzyme Inc.) and SUMITEAM AP (a protease produced by Shin Nihon Chemicals Corporation). In addition, enzymes having exopeptidase activity that are commercially available as food additives include FLAVORZYME (a protease produced by Novozymes), SUMITEAM FP (a protease produced by Shin Nihon Chemicals Corporation), ACTINASE (a protease produced by Kaken Pharmaceutical Co., Ltd.) and KOKULASE P (a protease produced by Genencor). In particular, it is preferable to treat the animal protein with an alkaline protease. Specifically, use of ALCALASE, SUMITEAM MP and so on is indicated.

Furthermore, the desired effect can be achieved by combining two or more types of protease. Specifically, it is preferable to combine ALCALASE with FLAVORZYME or ORIENTASE ONS (a protease produced by HBI) with FLAVORZYME. In particular, it is preferable to use a combination of two or more types of protease for the plant protein, and particularly preferable for at least one of the proteases to be an acidic protease. Specifically, it is preferable to combine Papain with SUMITEAM MP or NUCLEICIN with KOKULASE P, and particularly preferable to combine MOLSIN with ORIENTASE 20A, ORIENTASE 20A with SUMITEAM MP, MOLSIN with KOKULASE P or NEUTRASE with ORIENTASE 20A. When selecting enzymes, it is preferable to combine enzymes that generate many oligopeptides having from 2 to 4 amino acids, such as dipeptides, without completely decomposing the protein into free amino acids. These enzymes are preferably reacted with the raw materials for from 1 to 48 hours, and especially from 3 to 24 hours, under suitable conditions of pH and temperature. An enzymatic decomposition product obtained in this way may be used without further modification. Moreover, these enzymatic decomposition products preferably have an average peptide chain length of 2 to 3, as determined by the TNBS method.

In addition, the enzymatic decomposition product may be deamidated, as indicated in Working Example 4. The deamidation should be carried out using a publicly known method.

A characteristic of the present invention is the use of an enzymatic decomposition product of an animal protein and an enzymatic decomposition product of a plant protein. As shown in the working examples, using both an enzymatic decomposition product of an animal protein and an enzymatic decomposition product of a plant protein clearly strengthens the salty taste enhancement effect, regardless of whether the usage quantities of the enzymatic decomposition products are the same, compared to cases in which only an enzymatic decomposition product of an animal protein or only an enzymatic decomposition product of a plant protein is used. Because effects are obtained even with a small degree of blending, the ratio of the enzymatic decomposition products is not limited, but is generally between from 1:100 and 100:1 (in terms of active ingredient weight ratio). This ratio is preferably between from 1:10 and 10:1, and more preferably between from 1:3 and 3:1.

In addition, it is possible to further add a basic amino acid to the salty taste enhancer of the present invention, which is a mixture of an enzymatic decomposition product of an animal protein and an enzymatic decomposition product of a plant protein obtained using the method mentioned above. In such cases, the basic amino acid can be arginine, lysine, ornithine and the like, with arginine being particularly preferred. It is possible to use commercially available arginine or arginine purified using a routine method. The added quantity thereof is preferably from 0.01 to 20 parts by weight, and especially from 0.05 to 5 parts by weight, relative to 1 part by weight of the active ingredients of the enzymatic decomposition products (the quantity of active ingredient is obtained by subtracting the quantity of sodium chloride from the Brix value of the enzymatic decomposition products). It is possible to further blend potassium chloride in the salty taste enhancer. Commercially available potassium chloride may be used. The added quantity of potassium chloride is preferably from 0.01 to 50 parts by weight, and especially from 0.05 to 10 parts by weight, relative to 1 part by weight of the active ingredients of the enzymatic decomposition products.

The salty taste enhancer of the present invention may be used at the pH of the decomposition products, but it is possible to exhibit an even greater effect by adjusting the pH value to the mildly acidic to neutral range, and specifically a pH range of from 5 to 8. The pH value of the enzymatic decomposition products is approximately neutral, but in cases where a basic amino acid such as arginine is added, the pH becomes alkaline, the pH should therefore be adjusted in such cases. The pH should be adjusted by means of a suitable acid, preferably citric acid, acetic acid, lactic acid, succinic acid, fumaric acid, phosphoric acid, or malic acid, and more preferably hydrochloric acid. The adjustment period can be at any time before the product is used and can be, for example, at the raw materials stage, during the production stage, or after the finished product has been obtained. Because many foods have approximately neutral pH values, it is possible to use the salty taste enhancer of the present invention without special treatment.

In addition, the present invention relates to a method for enhancing a salty taste by using the salty taste enhancer of the present invention. It is possible to enhance the salty taste of a food by adding the salty taste enhancer of the present invention, which is obtained using the aforementioned method, to a common salt-containing food. The quantity of salty taste enhancer added depends on the type of food, but by adding from 0.5 to 2 wt. % of the active ingredient of the enzymatic decomposition product of the present invention, from 0.1 to 1.0 wt. % of arginine and from 0.1 to 1.0 wt. % of potassium chloride to a food, it is possible to produce a similar salty taste even if the quantity of common salt in the food is reduced by 50%. Therefore, in cases where it is desired that the quantity of common salt (sodium chloride) in a food should be reduced by 50%, from 0.5 to 2 wt. % of the active ingredient of the enzymatic decomposition product, from 0.1 to 1.0 wt. % of arginine and from 0.1 to 1.0 wt. % of potassium chloride should be added to the food, and the quantity of the salty taste enhancer of the present invention added should be increased or reduced according to the desired degree of common salt reduction. The active ingredient in the mixture of enzymatic decomposition products in the present invention is preferably added at from 0.05 to 5 wt. %, and especially from 0.1 to 3 wt. %, relative to the overall food or drink. By adding the salty taste enhancer of the present invention in this way, it is possible to enhance the salty taste of a reduced salt food or drink.

In addition, by adding the salty taste enhancer of the present invention, which is obtained in this way, in order to reduce the salt content (the quantity of sodium chloride) in a variety of foods or drinks, it is possible to produce reduced salt foods or drinks. The salty taste enhancer of the present invention does not have a taste that greatly restricts the use of acridity, bitterness and so on, and can therefore be used in a wide variety of foods and drinks. These foods and drinks include processed seafoods such as salmon flakes, karashimentaiko (salted cod roe seasoned with salt and hot red pepper), salted cod roe, grilled fish, dried fish, salted fish products, fish sausage, fish paste, boiled fish, fish boiled in soy sauce, or canned foods, snacks such as potato chips, rice crackers or cookies, noodle soups/sauces such as udon (thick wheat flour noodle) soups, soba (thin wheat flour noodle) soups, somen (Japanese vermicelli) soups, ramen (Chinese noodle) soups, chanpon (mixed Chinese noodle) soups and pasta sauces, rice-based foods such as rice balls, pilaf, fried rice, mixed boiled rice, porridge of rice and vegetables and boiled rice with tea, prepared foods such as spring rolls, steamed dumplings, Chinese-style dumplings, curries, stews and fried foods, processed livestock products such as hamburgers, sausages, hams and cheeses, processed vegetable products such as kimchi (pickled cabbage) or Japanese pickles, seasonings such as soy sauce, sauces, dressings, miso (fermented bean paste), mayonnaise and tomato ketchup and soups such as consommé soups, clear soups, miso soup, and potage soups.

In addition, the salty taste enhancer of the present invention may be used in combination with a variety of publicly known and commercially available additives used in order to reduce the common salt content of foods and drinks.

The present invention will now be explained in greater detail through the use of working examples, but is in no way limited to these working examples.

WORKING EXAMPLE 1

Methods of Analysis

1. Measurement of Common Salt Content

Common salt content was measured according to the following method. A sample was diluted 25 times in 1% HCl and shaken for 30 minutes to extract sodium ions, the extracted sample was diluted in an arbitrary quantity of 1% HCl, and sodium content was measured using an atomic absorption photometer (Z-2000, manufactured by Hitachi High Technologies). The common salt content was calculated by multiplying the obtained sodium content by 2.54.

2. Measurement of Active Ingredient Content

The active ingredient content of the protein enzymatic decomposition products was determined by subtracting the common salt content from the Brix value of the protein enzymatic decomposition products. Moreover, the Brix value was measured using a Brix meter (PAL-1, manufactured by Atago Co., Ltd.).

3. Measurement of Salty Taste Enhancement Effect (Salty Taste Enhancement Rate)

The salty taste strength of a sample solution adjusted so that the common salt concentration was 0.49% (w/w) was measured using a rating scale method. Specifically, the salty taste strength of a sample solution was compared with the salty taste strength of standard common salt solutions adjusted to concentrations of 0.49% (w/w), 0.625% (w/w), 0.76% (w/w) and 0.955% (w/w), and in cases where the salty taste strength of the sample solution linked the four concentration points of the standard common salt solutions in a straight line, the salty taste of the sample solution was evaluated by the position thereof on the straight line. The panel consisted of experts in the field of food and drink seasoning. In addition, the salty taste enhancement rate of the sample solution indicated the degree of enhancement relative to the salty taste strength of the 0.49% common salt solution, and was calculated according to the following formula.

Salty taste enhancement rate (%) = [Formula 1]

$$\frac{(\text{Common salt content derived from sensory evaluation results of sample solution (\%)} - 0.49)}{0.49} \times 100$$

WORKING EXAMPLE 2

Production of Enzymatic Decomposition Products of Animal Protein Materials 25.0 g of bonito broth extract (NP-40, produced by Nippon Suisan Kaisha, Ltd., crude protein content 40.0%), 11.3 g of powdered Alaskan pollock meat (produced by Nippon Suisan Kaisha, Ltd., crude protein content 88.8%), 10.8 g of casein (Sunlact S-3, produced by Taiyo Kagaku Co., Ltd., crude protein content 93.0%), 10.8 g of pork gelatin (AP-100, produced by Nitta Gelatin, Inc, crude protein content 93.0%) and 11.6 g of egg albumen (Egg Albumen K, produced by Kewpie Egg Corporation, crude protein content 86.5%) were each dispersed in distilled water, adjusted to a pH of 8.0 by means of 2N NaOH and made up to 100 g by adding water. 0.1 g of SUMITEAM MP (a protease produced by Shin Nihon Chemicals Corporation) was added to each of the reaction liquids and allowed to react for 24 hours at 50° C. Following the reaction, the enzyme was deactivated by heating for 30 minutes at 95° C., subjected to centrifugal separation for 15 minutes at 7000 rpm (using a 50A-IV centrifugal separator manufactured by Sakuma) and filtration (using a No. 2 filter paper produced by Advantec) so as to obtain enzymatic decomposition products of animal protein materials. The corresponding working example number, Brix value and NaCl content of these materials are shown in Table 1 below.

TABLE 1

| origin of protein | example | Brix (%) | NaCl (%) | active ingredient content (%) |
|---|---|---|---|---|
| bonito broth extract | example 2-1 | 19.9 | 4.51 | 15.39 |
| Alaskan pollock meat | example 2-2 | 10.4 | 0.29 | 10.11 |
| casein | example 2-3 | 8.8 | 0.42 | 8.38 |
| pork gelatin | example 2-4 | 12.3 | 0.95 | 11.35 |
| egg albumen | example 2-5 | 8.2 | 0.69 | 7.51 |

WORKING EXAMPLE 3

Production of Enzymatic Decomposition Products of Plant Protein Materials 11.1 g of wheat gluten (A-Glu-G, produced by Glico Foods Co., Ltd., crude protein content 89.8%) and 10.7 g of soy protein isolate (Fujipro FX, produced by Fuji Oil Co., Ltd., crude protein content 93.6%) were each dispersed in distilled water, adjusted to a pH of 3.0 by means of 2N HCl and made up to 100 g by adding water. 0.1 g of MOLSIN F (a protease produced by Kikkoman Corporation) and 0.1 g of ORIENTASE 20A (a protease produced by HBI) were added to each of the reaction liquids and allowed to react for 24 hours at 50° C. Following the reaction, the enzyme was deactivated by heating for 30 minutes at 95° C., subjected to centrifugal separation for 15 minutes at 7000 rpm (using a 50A-IV centrifugal separator manufactured by Sakuma) and filtration (using a No. 2 filter paper produced by Advantec) so as to obtain enzymatic decomposition products of plant protein materials. The corresponding working example number, Brix value and NaCl content of these materials are shown in Table 2 below.

TABLE 2

| origin of protein | example | Brix (%) | NaCl (%) | active ingredient content (%) |
|---|---|---|---|---|
| wheat gluten | example 3-1 | 10.9 | 0.11 | 10.79 |
| soy protein isolate | example 3-2 | 9.5 | 1.33 | 8.17 |

WORKING EXAMPLE 4

Production of Deamidated Enzymatic Decomposition Products of Plant Protein Materials 10.7 g of soy protein isolate (Fujipro FX, produced by Fuji Oil Co., Ltd., crude protein content 93.6%), 16.6 g of adjusted soy milk protein (Soyafit, produced by Fuji Oil Co., Ltd., crude protein content 60.1%), 13.7 g of corn gluten (Gluten Meal, produced by Oji Cornstarch Co., Ltd., crude protein content 73.1%), and 11.1 g of wheat gluten (A-Glu-G, produced by Glico Foods Co., Ltd., crude protein content 89.8%) were each made up to 100 g through dispersion in 0.6N HCl. These dispersions were deamidated by treatment in an autoclave at 120° C. for 120 minutes. Following deamidation, these reaction liquids were adjusted to a pH of 3.0 by means of 2N NaOH and made up to 100 g by adding water. 0.1 g of MOLSIN F (a protease produced by Kikkoman Corporation) and 0.1 g of ORIENTASE 20A (a protease produced by HBI) were added to each of the reaction liquids and allowed to react for 24 hours at 50° C. Following the reaction, the enzyme was deactivated by heating for 30 minutes at 95° C., subjected to centrifugal separation for 15 minutes at 7000 rpm (using a 50A-IV centrifugal separator manufactured by Sakuma) and filtration (using a No. 2 filter paper produced by Advantec) so as to obtain enzymatic decomposition products of plant protein materials. The corresponding working example number, Brix value and NaCl content of these materials are shown in Table 3 below.

TABLE 3

| origin of protein | example | Brix (%) | NaCl (%) | active ingredient content (%) |
|---|---|---|---|---|
| soy protein isolate | example 4-1 | 12.6 | 2.15 | 10.45 |
| adjusted soy milk protein | example 4-2 | 16.9 | 1.92 | 14.98 |
| corn gluten | example 4-3 | 14.4 | 1.64 | 12.76 |
| wheat gluten | example 4-4 | 14.8 | 1.10 | 13.70 |

WORKING EXAMPLE 5

Evaluation of the Salty Taste Enhancer of the Present Invention

The effects of the salty taste enhancer of the present invention prepared in Working Examples 2 to 4 were evaluated. The salty taste enhancer of the present invention was added so that the active ingredient content was 1 w/w %. Next, a 10 w/w % solution of sodium chloride and a 10 w/w % solution of arginine were added so that sodium chloride concentration was 0.49 w/w % and arginine concentration was 0.35 w/w % in the evaluation liquids. Evaluation liquids were obtained by adding 2N HCL in order to make the pH value 6.0 and then adding distilled water to bring total mass to 100 g. The compositions of the evaluation liquids are shown in Table 4. Using these evaluation liquids, the effects of the salty taste enhancers of the present invention were evaluated according to the rating scale method described in section 3 of Working Example 1. The results of the evaluations of the salty taste enhancement effect of these solutions are shown in FIG. 1.

TABLE 4

| | active ingredient o enzymatic decomposition product | | | | | | | | | | | | |
|---|---|---|---|---|---|---|---|---|---|---|---|---|---|
| | example 2-1 | example 2-2 | example 2-3 | example 2-4 | example 2-5 | example 3-1 | example 3-2 | example 4-1 | example 4-2 | example 4-3 | example 4-4 | Arg | NaCl |
| example 5-1 | 1.00% | — | — | — | — | — | — | — | — | — | — | 0.35% | 0.49% |
| example 5-2 | 0.50% | — | — | — | — | 0.50% | — | — | — | — | — | 0.35% | 0.49% |
| example 5-3 | 0.50% | — | — | — | — | — | 0.50% | — | — | — | — | 0.35% | 0.49% |
| example 5-4 | — | 1.00% | — | — | — | — | — | — | — | — | — | 0.35% | 0.49% |
| example 5-5 | — | 0.50% | — | — | — | 0.50% | — | — | — | — | — | 0.35% | 0.49% |
| example 5-6 | — | 0.50% | — | — | — | — | 0.50% | — | — | — | — | 0.35% | 0.49% |
| example 5-7 | — | — | 1.00% | — | — | — | — | — | — | — | — | 0.35% | 0.49% |
| example 5-8 | — | — | 0.50% | — | — | 0.50% | — | — | — | — | — | 0.35% | 0.49% |
| example 5-9 | — | — | 0.50% | — | — | — | 0.50% | — | — | — | — | 0.35% | 0.49% |
| example 5-10 | — | — | — | 1.00% | — | — | — | — | — | — | — | 0.35% | 0.49% |
| example 5-11 | — | — | — | 0.50% | — | 0.50% | — | — | — | — | — | 0.35% | 0.49% |
| example 5-12 | — | — | — | 0.50% | — | — | 0.50% | — | — | — | — | 0.35% | 0.49% |
| example 5-13 | — | — | — | — | 1.00% | — | — | — | — | — | — | 0.35% | 0.49% |
| example 5-14 | — | — | — | — | 0.50% | 0.50% | — | — | — | — | — | 0.35% | 0.49% |
| example 5-15 | — | — | — | — | 0.50% | — | 0.50% | — | — | — | — | 0.35% | 0.49% |
| example 5-16 | — | — | — | — | — | 1.00% | — | — | — | — | — | 0.35% | 0.49% |
| example 5-17 | — | — | — | — | — | — | 1.00% | — | — | — | — | 0.35% | 0.49% |

TABLE 4-continued

| | active ingredient o enzymatic decomposition product | | | | | | | | | | | | |
|---|---|---|---|---|---|---|---|---|---|---|---|---|
| | example 2-1 | example 2-2 | example 2-3 | example 2-4 | example 2-5 | example 3-1 | example 3-2 | example 4-1 | example 4-2 | example 4-3 | example 4-4 | Arg | NaCl |
| example 5-18 | — | — | — | — | — | 0.50% | 0.50% | — | — | — | — | 0.35% | 0.49% |
| example 5-19 | — | — | — | — | — | — | — | 1.00% | — | — | — | 0.35% | 0.49% |
| example 5-20 | 0.50% | — | — | — | — | — | — | 0.50% | — | — | — | 0.35% | 0.49% |
| example 5-21 | — | — | — | — | — | — | — | — | 1.00% | — | — | 0.35% | 0.49% |
| example 5-22 | 0.50% | — | — | — | — | — | — | — | 0.50% | — | — | 0.35% | 0.49% |
| example 5-23 | — | — | — | — | — | — | — | — | — | 1.00% | — | 0.35% | 0.49% |
| example 5-24 | 0.50% | — | — | — | — | — | — | — | — | 0.50% | — | 0.35% | 0.49% |
| example 5-25 | — | — | — | — | — | — | — | — | — | — | 1.00% | 0.35% | 0.49% |
| example 5-26 | 0.50% | — | — | — | — | — | — | — | — | — | 0.50% | 0.35% | 0.49% |

The results indicate that using a combination of an enzymatic decomposition product of an animal protein, and especially an enzymatic decomposition product of fish or shellfish, with an enzymatic decomposition product of a plant protein exhibits a synergistic effect and therefore achieves a greater salty taste enhancement effect than cases in which only a single enzymatic decomposition product of a protein is used.

WORKING EXAMPLE 6

Figure 2:
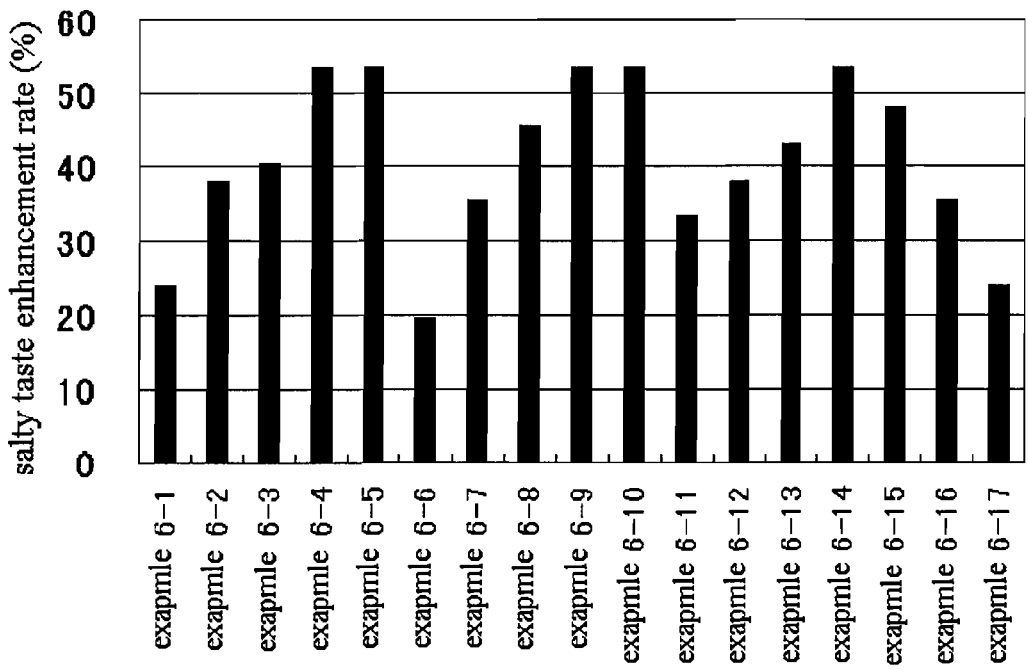
FIG. 2 shows the results of the evaluation of the salty taste enhancement effect according to the amounts included of an enzymatic decomposition product of a bonito broth extract and an enzymatic decomposition product of a soy protein isolate, as described in Working Example 6.
Figure 1:
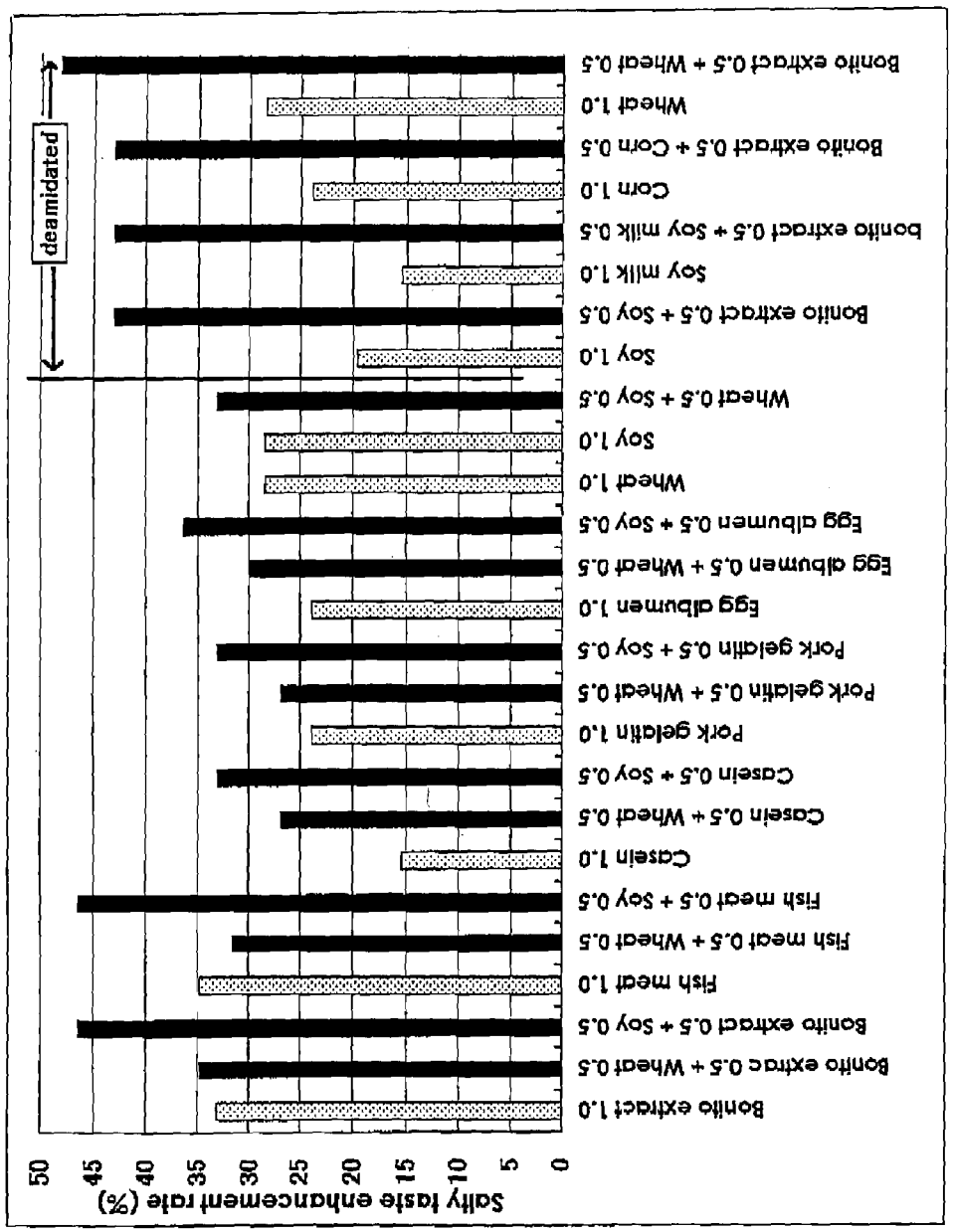

Blending Quantities of the Enzymatic Decomposition Product of an Animal Protein and the Enzymatic Decomposition Product of a Plant Protein An evaluation of the salty taste enhancement effect was carried out by altering the blending quantities of the enzymatic decomposition products prepared in Working Examples 2 and 4. The compositions of the evaluation liquids are shown in Table 5. Moreover, the pH of these evaluation liquids was adjusted to 6.0 by means of 2N HCl. Using these evaluation liquids, the effect of the salty taste enhancers of the present invention was evaluated according to the rating scale method described in section 3 of Working Example 1. The results of the evaluations of the salty taste enhancement effect of these solutions are shown in FIG. 2.

TABLE 5

| | active ingredient of enzymatic decomposition product | | | |
|---|---|---|---|---|
| | example 2-1 | example 4-1 | Arg | NaCl |
| example 6-1 | 0.85% | — | 0.23% | 0.49% |
| example 6-2 | 0.85% | 0.10% | 0.23% | 0.49% |
| example 6-3 | 0.85% | 0.20% | 0.23% | 0.49% |
| example 6-4 | 0.85% | 0.30% | 0.23% | 0.49% |
| example 6-5 | 0.85% | 0.50% | 0.23% | 0.49% |
| example 6-6 | — | 0.30% | 0.23% | 0.49% |
| example 6-7 | 0.17% | 0.30% | 0.23% | 0.49% |
| example 6-8 | 0.34% | 0.30% | 0.23% | 0.49% |
| example 6-9 | 0.51% | 0.30% | 0.23% | 0.49% |
| example 6-10 | 0.85% | 0.30% | 0.23% | 0.49% |
| example 6-11 | 1.00% | — | 0.70% | 0.49% |
| example 6-12 | 0.90% | 0.10% | 0.70% | 0.49% |
| example 6-13 | 0.75% | 0.25% | 0.70% | 0.49% |
| example 6-14 | 0.50% | 0.50% | 0.70% | 0.49% |
| example 6-15 | 0.25% | 0.75% | 0.70% | 0.49% |
| example 6-16 | 0.10% | 0.90% | 0.70% | 0.49% |
| example 6-17 | — | 1.00% | 0.70% | 0.49% |

The results clearly indicate that the salty taste enhancement effect of the salty taste enhancers of the present invention is exhibited in cases where the total active ingredient content is 0.5% or higher, and indicate that a strong effect is exhibited in cases where the ratio of the enzymatic decomposition products is from 1:9 to 9:1, and especially from 1:3 and 3:1.

WORKING EXAMPLE 7

Preparation of Enzymatic Decomposition Product of Bonito Broth Extract

A diluted solution of bonito broth extract was prepared by adding 2 kg of water to 1 kg of bonito broth extract (NP-40, produced by Nippon Suisan Kaisha, Ltd.). 3.85 g of SUMITEAM MP (a protease produced by Shin Nihon Chemicals Corporation) was added to this diluted solution of bonito broth extract and allowed to react at 50° C. After adding the SUMITEAM MP, samples were taken over time, and the enzyme was deactivated by heating for 30 minutes at 95° C., and the mixture was then subjected to centrifugal separation for 15 minutes at 7000 rpm and filtration using a filter paper so as to obtain enzymatic decomposition products of the bonito broth extract. Brix values and NaCl contents for various enzyme reaction times are shown in Table 6.

WORKING EXAMPLE 8

Preparation of Enzymatic Decomposition Products of Soy Protein Isolates 880 g of water was added to 120 g of soy protein isolate (Fujipro 515L, produced by Fuji Protein Co., Ltd., crude protein content 93.6%), 0.6 g of ALCALASE (a protease produced by Novozymes) was added thereto, and the obtained mixture was allowed to react for 4 hours at 55° C. Following the reaction, the pH was adjusted to 4.0 by means of 2N HCl, and 0.6 g of ORIENTASE AY (a protease produced by HBI) was added and allowed to react at 50° C. After adding the ORIENTASE AY, samples were taken over time, the enzyme was deactivated by heating for 30 minutes at 95° C., and the mixture was then subjected to centrifugal separation for 15 minutes at 7000 rpm and filtration using a filter paper so as to obtain enzymatic decomposition products of the soy protein isolate. Brix values and NaCl contents for various enzyme reaction times are shown in Table 6.

TABLE 6

| example | enzyme reaction time (hour) | Brix (%) | NaCl (%) | active ingredient (%) |
|---|---|---|---|---|
| 7-1 | 1 | 27.10 | 4.36 | 22.74 |
| 7-2 | 6 | 26.00 | 4.20 | 21.80 |
| 7-3 | 12 | 26.30 | 4.24 | 22.06 |
| 7-4 | 16 | 26.70 | 4.44 | 22.26 |
| 7-5 | 24 | 29.60 | 4.82 | 24.78 |
| 7-6 | 30 | 27.40 | 4.36 | 23.04 |
| 8-1 | 1 | 9.40 | 0.37 | 9.03 |
| 8-2 | 4 | 10.40 | 0.38 | 10.02 |
| 8-3 | 8 | 10.90 | 0.36 | 10.54 |
| 8-4 | 12 | 11.30 | 0.38 | 10.92 |
| 8-5 | 16 | 9.50 | 0.29 | 9.21 |
| 8-6 | 20 | 12.10 | 0.37 | 11.73 |

WORKING EXAMPLE 9

Evaluation of the Salty Taste Enhancers

An evaluation of the effects of the enzymatic decomposition products prepared in Working Examples 7 and 8 was performed. The active ingredient in Working Example 7 and the active ingredient in Working Example 8 were each added at a concentration of 0.5 w/w %. Next, a 10 w/w % solution of sodium chloride and a 10 w/w % solution of arginine (Arg) were added so that sodium chloride concentration was 0.49 w/w % and arginine concentration was 0.35 w/w % in the evaluation liquids. Evaluation liquids were obtained by adding 2N HCL in order to make the pH value 6.0 and then adding distilled water to bring total mass to 100 g. The evaluation liquid compositions are shown in Table 7. Using these evaluation liquids, the effect of the salty taste enhancers of the present invention was evaluated according to a rating scale method. The results of the evaluations of the salty taste enhancement effect of these solutions are shown in FIG. 3.

Figure 3:
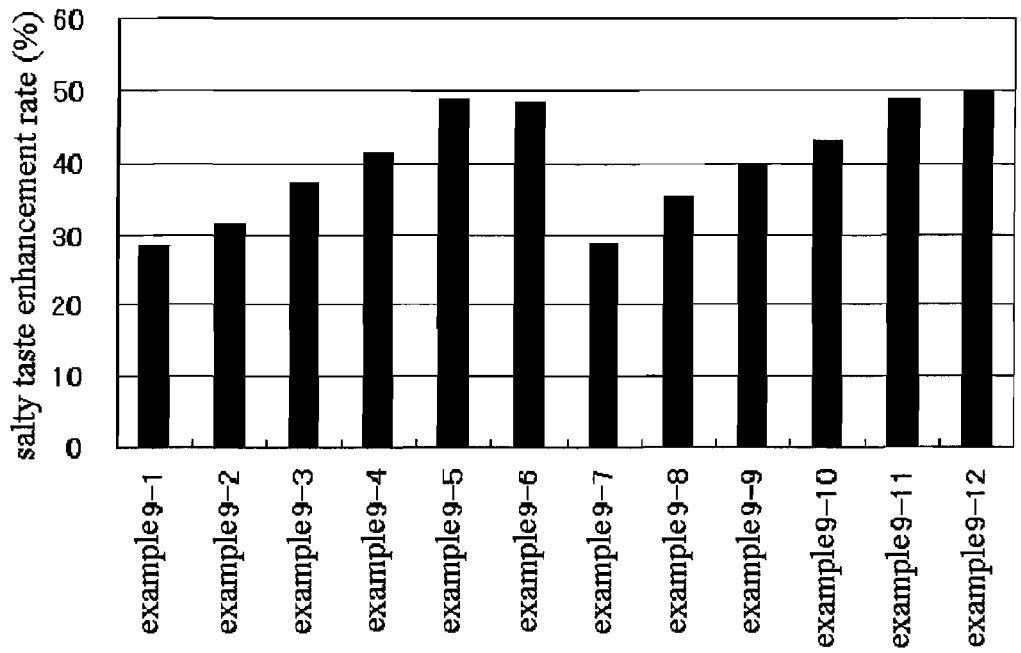
FIG. 3 shows the results of the evaluations of the difference in salty taste enhancement effect according to the difference in decomposition time of an enzymatic decomposition product of a bonito broth extract and an enzymatic decomposition product of a soy protein isolate, as described in Working Example 9.

As shown in FIG. 3, the enzyme reaction time depends on the combination of protein and enzyme, reaction conditions and so on, but is from at least 8 to 12 hours, and preferably from at least 16 to 24 hours. Because the reaction levels off with reaction times longer than these, there is no need to carry out the reaction for longer than is necessary.

TABLE 7

| | example 7-1 | example 7-2 | example 7-3 | example 7-4 | example 7-5 | example 7-6 | example 8-1 | example 8-2 |
|---|---|---|---|---|---|---|---|---|
| example 9-1 | 0.50% | — | — | — | — | — | — | — |
| example 9-2 | — | 0.50% | — | — | — | — | — | — |
| example 9-3 | — | — | 0.50% | — | — | — | — | — |
| example 9-4 | — | — | — | 0.50% | — | — | — | — |
| example 9-5 | — | — | — | — | 0.50% | — | — | — |
| example 9-6 | — | — | — | — | — | 0.50% | — | — |
| example 9-7 | — | — | — | — | — | — | 0.50% | — |
| example 9-8 | — | — | — | — | — | — | — | 0.50% |
| example 9-9 | — | — | — | — | — | — | — | — |
| example 9-10 | — | — | — | — | — | — | — | — |
| example 9-11 | — | — | — | — | — | — | — | — |
| example 9-12 | — | — | — | — | — | — | — | — |

| | example 8-3 | example 8-4 | example 8-5 | example 8-6 | example 7-5 | example 8-5 | Arg | NaCl |
|---|---|---|---|---|---|---|---|---|
| example 9-1 | — | — | — | — | — | — | 0.35% | 0.49% |
| example 9-2 | — | — | — | — | — | — | 0.35% | 0.49% |
| example 9-3 | — | — | — | — | — | — | 0.35% | 0.49% |
| example 9-4 | — | — | — | — | — | — | 0.35% | 0.49% |
| example 9-5 | — | — | — | — | — | 0.50% | 0.35% | 0.49% |

TABLE 7-continued

| example | | | | | | | | |
|---|---|---|---|---|---|---|---|---|
| example 9-6 | — | — | — | — | — | 0.50% | 0.35% | 0.49% |
| example 9-7 | — | — | — | — | 0.50% | — | 0.35% | 0.49% |
| example 9-8 | — | — | — | — | 0.50% | — | 0.35% | 0.49% |
| example 9-9 | 0.50% | — | — | — | 0.50% | — | 0.35% | 0.49% |
| example 9-10 | — | 0.50% | — | — | 0.50% | — | 0.35% | 0.49% |
| example 9-11 | — | — | 0.50% | — | 0.50% | — | 0.35% | 0.49% |
| example 9-12 | — | — | — | 0.50% | 0.50% | — | 0.35% | 0.49% |

WORKING EXAMPLE 10

Measurement of Amino Nitrogen Content

The amino nitrogen content of the enzymatic decomposition products prepared in Working Examples 7 and 8 was measured. Amino nitrogen content was measured using the Formol method. Specifically, samples were obtained by freeze drying the enzymatic decomposition products prepared in Working Examples 7 and 8. A 0.5 g sample was taken and made up to 100 ml with distilled water in a volumetric flask. A sample solution was obtained by filtering with a filter paper. 20 ml of the sample solution was taken and adjusted to a pH of 8.3 by means of 0.1N sodium hydroxide. 10 ml of formalin adjusted to a pH of 8.3 by means of dropwise addition of 0.1N sodium hydroxide with a buret, this titration was carried out using 0.1N sodium hydroxide until the pH reached 8.3, and the titer was measured. The amino nitrogen content was calculated using the following formula. The amino nitrogen content measurement results of these enzymatic decomposition products are shown in Table 8.

$$\text{Amino nitrogen content (\%)} = \frac{1.4 \times 0.1N \text{ NaOH titer (ml)} \times 10}{\text{Taken quantity of sample solution (ml)} \times \text{taken quantity of sample (g)}} \quad \text{[Formula 2]}$$

TABLE 8

| sample | amino nitrogen content (%) |
|---|---|
| example 7-1 | 1.59 |
| example 7-2 | 1.66 |
| example 7-3 | 1.76 |
| example 7-4 | 1.79 |
| example 7-5 | 1.86 |
| example 7-6 | 1.90 |
| example 8-1 | 1.65 |
| example 8-2 | 2.07 |
| example 8-3 | 2.42 |
| example 8-4 | 2.64 |
| example 8-5 | 2.85 |
| example 8-6 | 3.06 |

According to these results, a strong correlation ($R^2=0.9631$) was seen between the salty taste enhancement effect of the enzymatic decomposition products of the bonito broth extract and the amino nitrogen content in terms of enzyme reaction time. Similarly, a strong correlation ($R^2=0.9863$) was seen between the salty taste enhancement effect of the enzymatic decomposition products of soy beans and the amino nitrogen content in terms of enzyme reaction time. It was indicated that the enzymolysis of the proteins is preferably such that the amino nitrogen content is 1.8% or higher in the case of decomposition products of animal proteins and 2.5% or higher in the case of decomposition products of plant proteins.

WORKING EXAMPLE 11

Measurement of Dipeptide Content

The enzymatic decomposition products prepared in Working Examples 7 and 8 were treated using a cation exchange column and an activated charcoal column, and the dipeptide content was measured using high performance liquid chromatography.

(1) Cation Exchange Column Treatment

Samples were obtained by freeze drying the enzymatic decomposition products prepared in Working Examples 7 and 8, and these samples were diluted with 0.5N aqueous hydrochloric acid, charged in a Dowex 50W×4 column (200 to 400 mesh, H+ type, manufactured by Muromachi Technos Co., Ltd.) and washed with a quantity of distilled water equivalent to five times the capacity of the column so as to remove the unadsorbed fraction. The adsorbed fraction was recovered by eluting with a quantity of a 2N ammonia solution equivalent to five times the capacity of the column. The obtained adsorbed fraction was evaporated to dryness in a vacuum and then dissolved in distilled water.

(2) Activated Charcoal Column Treatment

The adsorbed fraction obtained from the above-mentioned cation exchange column treatment was charged in an activated charcoal (produced by Futamura Chemical Co., Ltd.) and washed with a quantity of distilled water equivalent to five times the capacity of the column so as to recover the unadsorbed fraction. The obtained unadsorbed fraction was evaporated to dryness in a vacuum and then dissolved in distilled water.

(3) Analysis Using High Performance Liquid Chromatography

Figure 4:
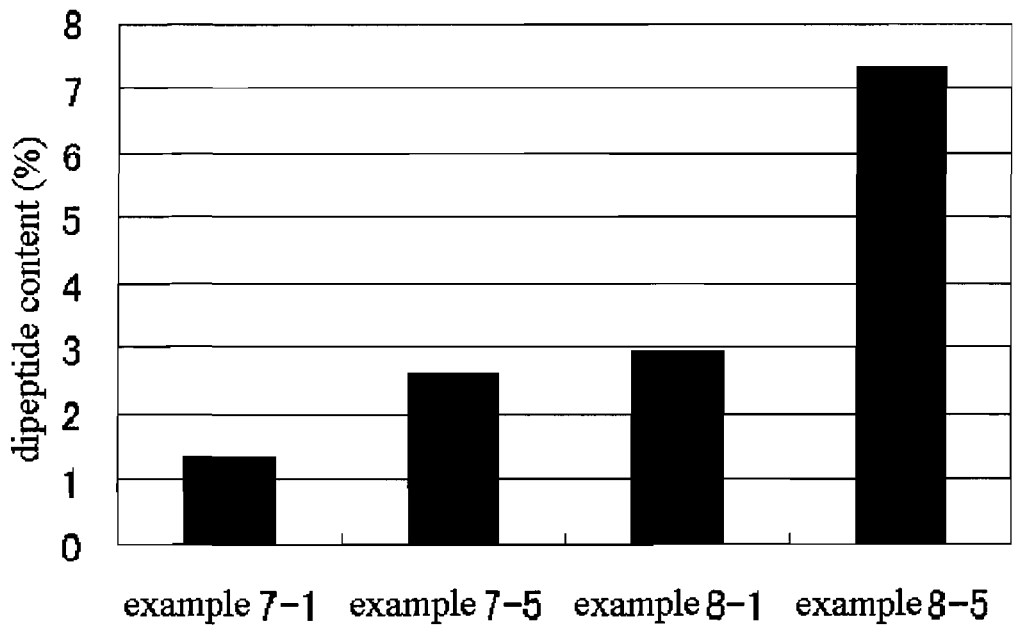
FIG. 4 shows the results of measurements of the peptide content in an enzymatic decomposition product of a bonito broth extract and an enzymatic decomposition product of a soy protein isolate, as described in Working Example 11.

The unadsorbed fraction obtained from the above-mentioned activated charcoal column treatment was analyzed using high performance liquid chromatography (LC-8020, manufactured by Tosoh Corporation). The column was a gel filtration column (YMC-Pack Diol 60:500×8.0 mm, manufactured by YMC), and analysis was carried out using an eluant adjusted so as to contain a 0.1M phosphate buffer solution of pH 7.0 containing 0.2M NaCl and acetonitrile at a ratio of 7:3, with the detection wavelength being 220 nm. The retention times of the reference substances are shown in Table 9. The retention times were from 0 to 23.5 minutes for oligopeptides, from 23.5 to 25 minutes for dipeptides and longer than 25 minutes for free amino acids. The dipeptide content was calculated using the following formula. The dipeptide contents of these enzymatic decomposition product samples are shown in FIG. 4.

TABLE 9

|  |  | retention times (min) |
| --- | --- | --- |
| dipeptide | Glu-Glu | 23.88 |
|  | Glu-Thr | 24.76 |
|  | Glu-Gly | 25.11 |
|  | Glu-Ala | 25.03 |
|  | Glu-Ser | 24.77 |
| free amino acids | Glu | 25.63 |
|  | Ser | 27.17 |
|  | Thr | 27.22 |
|  | Arg | 31.08 |
|  | Lys | 30.05 |
|  | Gly | 27.82 |
|  | Ala | 27.69 |
|  | Leu | 27.53 |
|  | Phe | 28.44 |
|  | Pro | 28.99 |

$$\text{Dipeptide content (\%)} = \frac{\text{Quantity recovered following activated charcoal column treatment (g)}}{\text{(Freeze dried sample (g))}} \times \frac{\text{Area of dipeptide region}}{\text{Total gel filtration area}} \times 100 \qquad \text{[Formula 3]}$$

These results indicate that decomposition products having a strong salty taste enhancement effect have a higher dipeptide content in the case of both enzymatic decomposition products of bonito broth extracts and enzymatic decomposition products of soy beans. This indicates that it is preferable to use the dipeptide content as an indicator and carry out decomposition in such a way that the dipeptide content increases when producing the enzymatic decomposition products of proteins of the present invention.

WORKING EXAMPLE 12

Production and Salty Taste Evaluation of a Food Containing the Salty Taste Enhancer of the Present Invention Salted Cod Roe A salted cod roe food product was prepared by adding the salty taste enhancers of the present invention obtained in Working Examples 7-5 and 8-5. From 60 to 140 g of common salt, 65 g of cod roe seasoning, 20 g of sodium malate, 15 g of sorbitol and 200 g of water were added to 2 kg of raw roe, and the obtained mixture was placed in a 5 liter cask. One further 5 liter cask was prepared, and the materials were transferred from one cask to the other, a process known as cask transfer. Cask transfer was then carried out continuously for 1 minute. For the next hour, cask transfer was carried out once every 10 minutes and for the following 3 hours, cask transfer was carried out once every 15 minutes. The mixture was left to stand overnight at a temperature of 15° C. so as to allow the contents of the cask to mature. The contents of the cask were then drained for 15 minutes and frozen by being left overnight in a freezer at a temperature of −30° C. The contents of the cask were then defrosted at 4° C. for 24 hours and then allowed to mature for a further 24 hours at 4° C. Finally, frozen salted cod roe was prepared by leaving the contents overnight in a freezer at a temperature of −30° C. Comparative salted cod roe products 1 to 4 were obtained in this way by altering the added quantity of common salt.

A comparative salted cod roe product 5 was obtained by adding 60 g of common salt, 30 g of potassium chloride, 65 g of cod roe seasoning, 20 g of sodium malate, 15 g of sorbitol, and 200 g of water to 2 kg of raw roe and then processing in the same way as described above. Present invention salted cod roe products 1 to 5 were obtained by adding 60 g of common salt, 30 g of potassium chloride, from 0.15 to 0.60% of Working Example 7-5 (as an active ingredient), from 0.25 to 1.00% of Working Example 8-5 (as an active ingredient), 8 g of arginine, 65 g of cod roe seasoning, 20 g of sodium malate, 15 g of sorbitol, and 200 g of water to 2 kg of raw roe and then processing in the same way as described above. The compositions of these products are shown in Table 10.

The sodium contents of these salted cod roe products were measured by atomic absorption spectrometry, and the common salt contents of the comparative products and present invention products were calculated from these sodium contents. In addition, a comparative evaluation of the salty taste intensity of present invention products 1 to 5 and comparative products 1 to 4 was carried out using a rating scale method. Specifically, evaluations were carried out in terms of the extent that the salted cod roe of the present invention evoked a similar salty taste to the comparative salted cod roe products, from which common salt concentrations were calculated sensorily. The panel consisted of experts in the field of food and drink seasoning. In addition, because adding the salty taste enhancer of the present invention increases salty taste intensity, the salt reduction rates for the present invention products were calculated using the following formula in order to determine to what extent it is possible to reduce the common salt content.

$$\text{Salt reduction rate (\%)} = \frac{\text{(Common salt content (\%) derived from sensory evaluation results} - \text{actual common salt content (\%))}}{\text{Common salt content (\%) derived from sensory evaulation results of sample}} \times 100 \qquad \text{[Formula 4]}$$

The trial evaluation results for the salted cod roe are shown in Table 10. The reduced salt product of comparative product 5, which contained only potassium chloride, had a low salt reduction rate and an odd flavor. Present invention products 1 to 5 had salt reduction rates of from 24.5 to 34.8% and did not have any odd flavors.

TABLE 10

| sample | | salt | potassium chloride | example 7-5 | example 8-5 | arginine | sensory evaluated salt content (%) | actual salt content (%) | salt reduction rate (%) |
|---|---|---|---|---|---|---|---|---|---|
| comparative product | 1 | 3.00 | — | — | — | — | 3.73 | 3.73 | |
| | 2 | 4.00 | — | — | — | — | 4.97 | 4.97 | |
| | 3 | 6.00 | — | — | — | — | 5.75 | 5.75 | |
| | 4 | 7.00 | — | — | — | — | 6.62 | 6.62 | |
| | 5 | 3.00 | 1.50 | — | — | — | 4.49 | 3.68 | 18.04 |
| invention product | 1 | 3.00 | 1.50 | 0.30 | 0.50 | 0.4 | 5.00 | 3.61 | 27.80 |
| | 2 | 3.00 | 1.50 | 0.15 | 0.50 | 0.4 | 4.62 | 3.49 | 24.46 |
| | 3 | 3.00 | 1.50 | 0.60 | 0.50 | 0.4 | 5.23 | 3.58 | 31.55 |
| | 4 | 3.00 | 1.50 | 0.30 | 0.25 | 0.4 | 5.32 | 3.57 | 32.89 |
| | 5 | 3.00 | 1.50 | 0.30 | 1.00 | 0.4 | 5.66 | 3.69 | 34.81 |

WORKING EXAMPLE 13

Production and Salty Taste Evaluation of a Food Containing the Salty Taste Enhancer of the Present Invention

Salmon Flakes

As a food having the salty taste enhancers of the present invention obtained in Working Examples 7-5 and 8-5 added therein, salmon flakes were prepared. From 2 to 5 kg of common salt, 1.0 kg of sodium glutamate, 0.1 kg of sodium inosinate, 10 kg of vegetable oil and 20 kg of water were added to 100 kg of cooked flaked salmon, and the obtained mixture was transferred to a kneader. This was mixed while being heated and dried until the weight of the mixture reached 100 kg. Salmon flakes were prepared by placing 70 g portions of the mixture in heat-resistant bottles, sealing the bottles and then heating for 40 minutes at 115° C. Comparative salmon flake products 1 to 4 were obtained in this way by altering the added quantity of common salt.

2 kg of common salt, 0.6 kg of potassium chloride, 1.0 kg of sodium glutamate, 0.1 kg of sodium inosinate, 10 kg of vegetable oil, and 20 kg of water were added to 100 kg of cooked flaked salmon, and the obtained mixture was transferred to a kneader. Comparative product 5 was obtained by processing in the same way as described above.

2 kg of common salt, 0.6 kg of potassium chloride, from 0 to 0.3% of Working Example 7-5 (as an active ingredient), from 0 to 0.5% of Working Example 8-5 (as an active ingredient), 0.2 kg of arginine, 0.05 kg of malic acid, 1.0 kg of sodium glutamate, 0.1 kg of sodium inosinate, 10 kg of vegetable oil, and 20 kg of water were added to 100 kg of cooked flaked salmon, and the obtained mixture was transferred to a kneader. Present invention products 1 to 3 were obtained by processing in the same way as described above. The compositions of these products are shown in Table 11.

The sodium content of these salmon flakes was measured by atomic absorption spectrometry, from which the common salt content of the salmon flakes of the comparative examples and working examples was calculated. In addition, a comparative evaluation with the present invention products was carried out in the same way as in Working Example 12. The evaluation results for the salmon flakes are shown in table 11. The reduced salt product of comparative product 5, which contained only potassium chloride, had a low salt reduction rate and an odd flavor. Present invention products 1 to 3 had salt reduction rates of from 32.2 to 40.4% and did not have any odd flavors.

TABLE 11

| sample | | salt | potassium chloride | example 7-5 | example 8-5 | arginine | sensory evaluated salt content (%) | actual salt content (%) | salt reduction rate (%) |
|---|---|---|---|---|---|---|---|---|---|
| comparative product | 1 | 2.50 | — | — | — | — | 2.60 | 2.60 | |
| | 2 | 3.00 | — | — | — | — | 3.10 | 3.10 | |
| | 3 | 4.00 | — | — | — | — | 4.15 | 4.15 | |
| | 4 | 5.00 | — | — | — | — | 5.20 | 5.20 | |
| | 5 | 3.00 | 0.60 | — | — | — | 3.20 | 2.64 | 17.50 |
| invention product | 1 | 2.50 | 0.60 | 0.30 | 0.00 | 0.20 | 3.98 | 2.70 | 32.16 |
| | 2 | 2.50 | 0.60 | 0.00 | 0.50 | 0.20 | 4.00 | 2.65 | 33.75 |
| | 3 | 2.50 | 0.60 | 0.30 | 0.50 | 0.20 | 4.58 | 2.73 | 40.39 |

WORKING EXAMPLE 14

Production and Salty Taste Evaluation of a Food Containing the Salty Taste Enhancer of the Present Invention Fish Sausages Fish sausages were prepared as a food having the salty taste enhancers of the present invention obtained in Working Examples 7-5 and 8-5 added therein. 45 kg of minced white fish, from 1.0 to 2.0 kg of common salt, 0.5 kg of sodium glutamate, and 0.05 kg of sodium inosinate were placed in a silent cutter and kneaded. 2 kg of soy bean protein, 10 kg of starch, 2 kg of sugar, 8 kg of vegetable oil, 30 kg of water, and a variety of seasonings were added to bring the weight of the mixture up to 100 kg, and the mixture was then sufficiently kneaded to obtain a minced fish meat for fish sausages. Fish sausages were then prepared by stuffing this minced fish meat into casings and then heating for 40 minutes at 115° C. Comparative fish sausage products 1 to 4 were obtained in this way by altering the added quantity of common salt.

45 kg of minced white fish, 1.2 kg of common salt, 0.5 kg of potassium chloride, 0.5 kg of sodium glutamate, 0.05 kg of sodium inosinate, from 0.25 to 0.5% of Working Example 7-5 (as an active ingredient), from 0.4 to 1.0% of Working Example 8-5 (as an active ingredient), from 0.1 to 0.35 kg of arginine, and 0.05 kg of malic acid were placed in a silent cutter and kneaded. 2 kg of soy bean protein, 10 kg of starch, 2 kg of sugar, 8 kg of vegetable oil, 30 kg of water, and a variety of seasonings were added to bring the weight of the mixture up to 100 kg, and the mixture was then sufficiently kneaded to obtain a minced fish meat for fish sausages. Present invention fish sausages were then prepared by stuffing this minced fish meat into casings and then heating for 40 minutes at 115° C. These were known as present invention products 1 to 5. The compositions of these products are shown in Table 12.

The sodium content of these fish sausages was measured by atomic absorption spectrometry, from which the common salt content of the fish sausages of the comparative examples and working examples was calculated. In addition, a comparative evaluation with the present invention products was carried out in the same way as in Working Example 12. The trial evaluation results for the fish sausages are shown in Table 12. Present invention products 1 to 4 had salt reduction rates of from 33.8 to 39.1%, but present invention product 5, which had a low arginine content, had a somewhat low salt reduction rate of 26.6%.

WORKING EXAMPLE 15

Production and Salty Taste Evaluation of a Food Containing the Salty Taste Enhancer of the Present Invention Grilled Salted Fish Grilled white salmon was prepared as a food having the salty taste enhancers of the present invention obtained in Working Examples 7-5 and 8-5. 30 g of pickling fluid was added to 40 g of white salmon fillet and then refrigerated for 24 hours. The composition of the pickling fluid was an aqueous solution of common salt at a concentration of from 1.9 to 5.0% relative to the fish meat. Solid-liquid separation was then carried out, and the white salmon fillet was placed on a rack to dry for 30 minutes. The white salmon was then grilled for 7 minutes on a fish grill and transferred to a plate once it had been confirmed that the temperature inside the fish fillet was 80° C. or higher.

30 g of pickling fluid was added to 40 g of white salmon fillet and then refrigerated for 24 hours. The composition of the pickling fluid was 1.6% of common salt, from 0.35 to 1.0% of Working Example 7-5 (as an active ingredient), from 0.4 to 2.0% of Working Example 8-5 (as an active ingredient) and from 0.15 to 0.7% of arginine relative to the fish meat, and the pH of the pickling fluid was adjusted to 5.0 by means of malic acid. Present invention products 1 to 5 were obtained by processing in the same way as in the above-mentioned comparative example.

The sodium content of these white salmon fillets (before grilling, excluding the skin) was measured by atomic absorption spectrometry, from which the common salt content of the white salmon fillets of the comparative examples and working examples was calculated. In addition, a comparative evaluation with the present invention products was carried out in the same way as in Working Example 12. The trial evaluation results for the grilled salmon fillets are shown in Table 13. All the present invention products had salt reduction rates of from 35 to 45%.

TABLE 12

| sample | | salt | potassium chloride | example 7-5 | example 8-5 | arginine | sensory evaluated salt content (%) | actual salt content (%) | salt reduction rate (%) |
|---|---|---|---|---|---|---|---|---|---|
| comparative product | 1 | 1.00 | — | — | — | — | 1.10 | 1.10 | |
| | 2 | 1.40 | — | — | — | — | 1.50 | 1.50 | |
| | 3 | 1.80 | — | — | — | — | 1.80 | 1.80 | |
| | 4 | 2.20 | — | — | — | — | 2.30 | 2.30 | |
| invention product | 1 | 1.20 | 0.50 | 0.25 | 0.50 | 0.35 | 2.27 | 1.50 | 33.80 |
| | 2 | 1.20 | 0.50 | 0.35 | 0.40 | 0.35 | 2.24 | 1.45 | 35.24 |
| | 3 | 1.20 | 0.50 | 0.50 | 1.00 | 0.35 | 2.54 | 1.55 | 39.07 |
| | 4 | 1.20 | 0.50 | 0.50 | 0.50 | 0.35 | 2.26 | 1.50 | 33.50 |
| | 5 | 1.20 | 0.50 | 0.50 | 0.50 | 0.10 | 1.91 | 1.40 | 26.55 |

TABLE 13

| sample | | salt | potassium chloride | example 7-5 | example 8-5 | arginine | sensory evaluated salt content (%) | actual salt content (%) | salt reduction rate (%) |
|---|---|---|---|---|---|---|---|---|---|
| comparative product | 1 | 1.85 | — | — | — | — | 1.08 | 1.08 | |
| | 2 | 2.50 | — | — | — | — | 1.65 | 1.65 | |
| | 3 | 3.50 | — | — | — | — | 2.10 | 2.10 | |
| | 4 | 5.00 | — | — | — | — | 2.43 | 2.43 | |
| invention product | 1 | 1.60 | 2.00 | 0.35 | 0.40 | 0.15 | 2.31 | 1.50 | 35.00 |
| | 2 | 1.60 | 2.00 | 0.50 | 1.00 | 0.15 | 2.23 | 1.45 | 35.00 |
| | 3 | 1.60 | 2.00 | 1.00 | 2.00 | 0.15 | 2.82 | 1.55 | 45.00 |
| | 4 | 1.60 | 2.00 | 0.35 | 0.40 | 0.25 | 2.73 | 1.50 | 45.00 |
| | 5 | 1.60 | 2.00 | 0.35 | 0.40 | 0.35 | 2.31 | 1.50 | 35.00 |

WORKING EXAMPLE 16

Production and Salty Taste Evaluation of a Food Containing the Salty Taste Enhancer of the Present Invention Grilled Rice Balls Grilled rice balls were prepared by adding the salty taste enhancers of the present invention obtained in Working Examples 7-5 and 8-5. 1 kg of rice was boiled in 1.34 kg of water. 0.13 kg of primary seasoning liquid was added to this boiled rice and mixed. This seasoned boiled rice was molded into rice balls, each weighing 80 g. One side of each rice ball was coated with 0.8 g of secondary seasoning liquid, and the rice balls were then quickly frozen to obtain frozen grilled rice balls.

For the comparative products, the basic composition of the primary seasoning liquid was a mixture of 40% soy sauce, 5% common salt, 5% caster sugar, 1.0% sodium glutamate, 0.05% nucleic acid-based seasoning and 2.0% bonito/kelp-based seasoning, with the remainder being water. The basic composition of the secondary seasoning liquid was a mixture of 80% soy sauce, 5.0% bonito/kelp-based seasoning and 2.5% yeast extract, with the remainder being water. Comparative products 1 to 3 were prepared by altering the quantities of soy sauce and common salt in these seasonings.

For the present invention products, the basic composition of the primary seasoning liquid was a mixture of from 33 to 39% soy sauce, 0% common salt, 5% caster sugar, 1.0% sodium glutamate, 0.05% nucleic acid-based seasoning, 2.0% bonito/kelp-based seasoning, from 2.5 to 4.1% potassium chloride, 2.64% of Working Example 7-5 (as an active ingredient), 3.62% of Working Example 8-5 (as an active ingredient), 3.28% of arginine, and sufficient malic acid to make the pH of the seasoning liquid 5.0, with the remainder being water. The basic composition of the secondary seasoning liquid was a mixture of from 50 to 60% soy sauce, 5.0% bonito/kelp-based seasoning, 2.5% yeast extract, 2.5% potassium chloride, 1.32% of Working Example 7-5 (as an active ingredient), 1.51% of Working Example 8-5 (as an active ingredient), 1.64% of arginine, 0.5% of malic acid, and sufficient malic acid to make the pH of the seasoning liquid 5.0, with the remainder being water.

The sodium content of these grilled rice balls was measured by atomic absorption spectrometry, from which the common salt content of the grilled rice balls of the comparative products and invention products was calculated. In addition, a comparative evaluation with the present invention products was carried out in the same way as in Working Example 12. The trial evaluation results for the grilled rice balls are shown in Table 14. Present invention products 1, 2, and 3 had salt reduction rates of from 33.0 to 40.8%, and did not have any odd flavors. In addition, there were no odd flavors derived from the potassium chloride.

TABLE 14

| sample | | seasoning liquid | salt | potassium chloride | example 7-5 | example 8-5 | arginine | sensory evaluated salt content (%) | actual salt content (%) | salt reduction rate (%) |
|---|---|---|---|---|---|---|---|---|---|---|
| comparative product | 1 | primary | 11.91 | — | — | — | — | 0.90 | 0.90 | |
| | | secondary | 14.19 | — | — | — | — | | | |
| | 2 | primary | 7.37 | — | — | — | — | 0.54 | 0.54 | |
| | | secondary | 10.92 | — | — | — | — | | | |
| | 3 | primary | 6.72 | — | — | — | — | 0.50 | 0.50 | |
| | | secondary | 9.20 | — | — | — | — | | | |
| invention product | 1 | primary | 7.37 | 3.69 | 2.64 | 3.62 | 3.28 | 0.90 | 0.60 | 33.0 |
| | | secondary | 10.92 | 2.46 | 1.32 | 1.51 | 1.64 | | | |
| | 2 | primary | 7.11 | 4.10 | 2.64 | 3.62 | 3.28 | 0.90 | 0.56 | 38.0 |
| | | secondary | 9.61 | 2.46 | 1.32 | 1.51 | 1.64 | | | |
| | 3 | primary | 6.72 | 4.10 | 2.64 | 3.62 | 3.28 | 0.90 | 0.53 | 40.8 |
| | | secondary | 9.20 | 2.46 | 1.32 | 1.51 | 1.64 | | | |

WORKING EXAMPLE 17

Production and Salty Taste Evaluation of a Food Containing the Salty Taste Enhancer of the Present Invention Noodle Soups Noodle soups were prepared as foods by adding the salty taste enhancers of the present invention obtained in Working Examples 7-5 and 8-5. 100 ml of concentrated noodle soup equivalent to a commercially available threefold concentrated noodle soup was prepared by using 32% dark soy sauce, 13% sugar, 5% bonito/kelp extract, 1% sweet saké, 0.5% sodium glutamate, 0.05% nucleic acid-based seasoning, 0.2% yeast extract, common salt, and an arbitrary quantity of the present invention product (combinations indicated in Table 15). The raw materials were mixed together and homogeneously dissolved, and the pH of the mixture was adjusted to 5.0 using citric acid. The mixture was placed in plastic pouches, heated for 10 minutes at 85° C. (±5° C.), rapidly cooled, and then diluted 6 fold so to obtain noodle soups.

The common salt content of the noodle soups of the comparative products and present invention products was calculated from the salt content of the raw materials and the quantities of these raw materials added to the noodle soups. In addition, a comparative evaluation with the present invention products was carried out in the same way as in Working Example 12. The trial evaluation results for the noodle soups are shown in Table 15. The present invention products had salt reduction rates of from 30.77 to 38.36%, and therefore exhibited a salt reduction effect. Present invention product 7 had an odd flavor, thought to be due to the presence of potassium chloride.

TABLE 15

| | | added amount (%) | | | | sensory | salt |
|---|---|---|---|---|---|---|---|
| | | salt | potassium chloride | example 7-5 | example 8-5 | arginine | evaluated salt content (%) | reduction rate (%) |
| comparative product | 1 | 1.00 | | | | | 1.00 | |
| | 2 | 1.20 | | | | | 1.20 | |
| | 3 | 1.40 | | | | | 1.40 | |
| | 4 | 1.60 | | | | | 1.60 | |
| | 5 | 1.80 | | | | | 1.80 | |
| invention product | 1 | 1.00 | 0.50 | 0.06 | 0.10 | 0.10 | 1.54 | 35.25 |
| | 2 | 1.00 | 0.50 | 0.12 | 0.10 | 0.10 | 1.59 | 37.06 |
| | 3 | 1.00 | 0.50 | 0.00 | 0.10 | 0.10 | 1.47 | 31.82 |
| | 4 | 1.00 | 0.50 | 0.06 | 0.00 | 0.10 | 1.44 | 30.77 |
| | 5 | 1.00 | 0.50 | 0.06 | 0.15 | 0.10 | 1.60 | 37.50 |
| | 6 | 1.00 | 0.50 | 0.06 | 0.15 | 0.15 | 1.54 | 35.25 |
| | 7 | 1.00 | 0.75 | 0.06 | 0.15 | 0.10 | 1.62 | 38.36 |

INDUSTRIAL APPLICABILITY

According to the present invention, an excellent salty taste enhancer is provided, by which it is possible to compensate for insufficient salty taste when attempting to reduce salt content in a food and thereby to provide a variety of reduced salt foods having excellent taste.

The invention claimed is:

1. A salty taste enhancer that comprises an enzymatic decomposition product of an animal protein and an enzymatic decomposition product of a plant protein, wherein:
   (i) a combination of the enzymatic decomposition product of the animal protein and the enzymatic decomposition product of the plant protein in the salty taste enhancer is:
      (a) a product of meat or internal organs of domestic animals, poultry, fish, or shellfish, or milk, or eggs, processed with an enzyme as the enzymatic decomposition product of the animal protein, and
         a product of beans processed with an enzyme as the enzymatic decomposition product of the plant protein, or
      (b) the product of the fish processed with an enzyme as the enzymatic decomposition product of the animal protein, and
         a deamidated product of beans, wheat, corn, or rice, processed with an enzyme as the enzymatic decomposition product of the plant protein,
   (ii) the enzymatic decomposition product of the animal protein and the enzymatic decomposition product of the plant protein have an average peptide chain length from 2 to 3 amino acids when determined by a TNBS method,
   (iii) an amino nitrogen content of the enzymatic decomposition product of the animal protein is 1.76% or more, and an amino nitrogen content of the enzymatic decomposition product of the plant protein is 2.07% or more,
   (iv) the salty taste enhancer comprises the enzymatic decomposition product of the animal protein and the enzymatic decomposition product of the plant protein at a ratio of between 1:10 and 10:1, and
   (v) the salty taste enhancer, which comprises the combination of the enzymatic decomposition product of the animal protein and the enzymatic decomposition product of the plant protein in (i) above, has a higher salty taste enhancing effect than a salty taste enhancing effect of a single component of either the enzymatic decomposition product of the animal protein alone as the enzymatic decomposition product or the enzymatic decomposition product of the plant protein alone as the enzymatic decomposition product, when the single component contains a same amount of the enzymatic decomposition product as a total amount of the enzymatic decomposition products in the salty taste enhancer.

2. The salty taste enhancer according to claim 1, wherein the enzymatic decomposition products are products that have been treated with a protein-hydrolyzing enzyme.

3. The salty taste enhancer according to claim 1, wherein the animal protein is at least one extract selected from the group consisting of a beef extract, a chicken extract, a pork extract, a fish extract, or a shellfish extract.

4. The salty taste enhancer according to claim 1, which further comprises a basic amino acid.

5. The salty taste enhancer according to claim 4, wherein the basic amino acid is arginine.

6. The salty taste enhancer according to claim 1, which further comprises potassium chloride.

7. The salty taste enhancer according to claim 1, wherein pH of the enzymatic decomposition product is adjusted to a value of from 5 to 8.

8. A method for enhancing a salty taste, wherein the salty taste enhancer according to claim 1 is added to a common salt-containing food.

9. A food or drink that comprises the salty taste enhancer according to claim 1.

10. The food or drink according to claim 9, wherein a common salt content in the food or the drink is lower than the common salt content in conventional foods or drinks.

11. The salty taste enhancer according to claim 1, wherein the enzymatic decomposition product of the plant protein in (b) is the deamidated product of soy beans processed with the enzyme.

12. A method for enhancing a salty taste, wherein the method comprises:

adding an enzymatic decomposition product of an animal protein, an enzymatic decomposition product of a plant protein, and arginine to a common salt-containing food, wherein:

(i) a combination of the enzymatic decomposition product of the animal protein and the enzymatic decomposition product of the plant protein is:

(a) the enzymatic decomposition product of the animal protein obtained by processing a meat or internal organs of domestic animals, poultry, fish, or shellfish, or milk, or eggs, with an enzyme, and the enzymatic decomposition product of the plant protein obtained by processing beans with an enzyme, or (b) the enzymatic decomposition product of the animal protein obtained by processing fish with an enzyme, and a deamidated enzymatic decomposition product obtained by processing beans, wheat, corn, or rice with an enzyme, (ii) the enzymatic decomposition product of the animal protein and the enzymatic decomposition product of the plant protein have an average peptide chain length from 2 to 3 amino acids when determined by the TNBS method, (iii) an amino nitrogen content of the enzymatic decomposition product of the animal protein is 1.76% or more, and an amino nitrogen content of the enzymatic decomposition product of the plant protein is 2.07% or more, (iv) an amount ratio of the added enzymatic decomposition product of the animal protein relative to the added enzymatic decomposition product of the plant protein is between 1:10 and 10:1, and (v) a composition of the combination, which comprises the enzymatic decomposition product of the animal protein and the enzymatic decomposition product of the plant protein in (i) above, and the arginine has a higher salty taste enhancing effect than a salty taste enhancing effect of a mixture of the enzymatic decomposition product of the animal protein alone as the enzymatic decomposition product and the arginine or a mixture of the enzymatic decomposition product of the plant protein alone as the enzymatic decomposition product and the arginine, when the mixture contains a same amount of the enzymatic decomposition product as a total amount of the enzymatic decomposition products in the combination.

13. The salty taste enhancing method according to claim 12, further comprising potassium chloride.

14. The method for enhancing a salty taste according to claim 12, wherein the enzymatic decomposition product of the plant protein in (b) is the deamidated product of soy beans processed with the enzyme.

* * * * *